United States Patent [19]
Schmid

[11] Patent Number: 5,794,875
[45] Date of Patent: Aug. 18, 1998

[54] BELT RETRACTOR FOR A VEHICLE SAFETY BELT SYSTEM

[75] Inventor: Johannes Schmid, Schwäbisch Gmünd, Germany

[73] Assignee: TRW Occupant Restraint Systems GmbH, Alfdorf, Germany

[21] Appl. No.: 750,488

[22] PCT Filed: Mar. 28, 1996

[86] PCT No.: PCT/EP96/01361

§ 371 Date: Dec. 10, 1996

§ 102(e) Date: Dec. 10, 1996

[87] PCT Pub. No.: WO96/32304

PCT Pub. Date: Oct. 17, 1996

[30] Foreign Application Priority Data

Apr. 11, 1995 [DE] Germany .................. 195 13 724.8

[51] Int. Cl.⁶ .................................................. B60R 22/46
[52] U.S. Cl. .................................................. 242/374
[58] Field of Search .................. 242/374; 280/806; 297/478–480

[56] References Cited

U.S. PATENT DOCUMENTS 4,546,934 10/1985 Nishimura et al. .................. 242/374
4,568,037 2/1986 Kawaguchi et al. .................. 242/374
4,585,184 4/1986 Kawaguchi et al. .................. 242/374
4,592,520 6/1986 Kawaguchi .................. 242/374
4,932,603 6/1990 Yamanoi et al. .................. 242/374

FOREIGN PATENT DOCUMENTS 29500807 1/1995 Germany .
57-128169 8/1982 Japan .
59-195570 11/1983 Japan .
38975 2/1991 Japan .

Primary Examiner—John M. Jillions
Attorney, Agent, or Firm—Tarolli, Sundheim, Covell, Tummino & Szabo

[57] ABSTRACT

In the context of a belt retractor for a vehicle safety belt system comprising a locking device for a belt drum (14) and a rotary belt pretensioner drive (20), said drive being able to be connected drivingly with a drive pinion for the belt drum (14) via a coupling having pawls (34) able to be shifted between a rest position out of engagement with the drive pinion (16) and a working position in engagement with the drive pinion (16), it is desired to provide reliable interruption of the driving connection of the coupling when tensioning by the belt pretensioner drive is completed. For this purpose there is the provision that the coupling pawls (34) are able to be moved positively both out of the rest position into the working position and furthermore from the working position into the rest position by running against cam surfaces rotating in relation to them.

9 Claims, 3 Drawing Sheets

BELT RETRACTOR FOR A VEHICLE SAFETY BELT SYSTEM

The invention relates to a belt retractor for a vehicle safety belt system comprising a locking device for a belt drum and a rotary belt pretensioner drive, said drive being able to be connected drivingly with a drive pinion for the belt drum via a coupling having pawls able to be shifted between a rest position out of engagement with the drive pinion and a working position in engagement with the drive pinion.

In the case of such a belt retractor a drive connection between the belt drum and the belt pretensioner drive is only produced by actuation of the coupling so that the belt drum is able to be turned in normal duty without hindrance. However it is desirable for the belt drum to be able to be turned again freely as well after the tensioning operation.

Accordingly one object of the invention is to further develop a belt retractor of the type initially mentioned in such a manner that the drive connection of the coupling is terminated again after the end of the tensioning operation in a reliable fashion.

In the case of a belt retractor of the type initially mentioned such aim is attained because the coupling pawls are able to be moved positively both out of the rest position into the working position and furthermore from the working position into the rest position by running against cam surfaces rotating in relation to them. This design renders possible, owing to the positive movement of the coupling pawls, a reliable termination of the drive connection of the coupling after the end of the tensioning process.

In accordance with the preferred embodiment of the invention there is a provision such that on a drive side thereof the coupling possesses a hub, on which the coupling pawls are deflectably supported and a cage releasably fixed on the housing of the belt retractor and on which the cam surfaces are formed. This design renders possible a form of the coupling which is particularly compact in the radial direction, since the setting of the coupling pawls is effected by a rotary movement.

In accordance with the preferred embodiment of the invention there is the further provision that the hub is arranged concentrically to the drive pinion, that between the hub and the drive pinion an annular space is formed, in which the coupling pawls are arranged, a first end thereof so bearing on the hub that a second end thereof is able to be pivoted into engagement with the gear teeth of the drive pinion, that the coupling pawls are provided with a guide in ramp and with a guide out ramp and in that the cam surfaces of the cage, which is as well concentric to the drive pinion, are formed on projections extending into the annular space between the coupling pawls as guide in surfaces and guide out surfaces, which cooperate with the guide in and, respectively, the guide out ramps. Owing to this configuration it is possible to obtain a form of the coupling which is compact in the axial direction.

In accordance with the preferred embodiment of the invention there is the further provision that the first end of each coupling pawl is designed with a rounded projection pivotally mounted in a corresponding recess at the inner side of the hub. In cooperation with the positive movement for the coupling pawls such supporting action for the first end of the coupling pawls means that there is a particularly simple bearing arrangement for the coupling pawls.

In accordance with the preferred embodiment of the invention there is the further provision that the hub possesses a radial support shoulder for each coupling pawl. This configuration means that there is a more particularly advantageous transmission of force to the coupling pawls, something which contributes to a compact form of the coupling.

The invention will now be described with reference to the preferred embodiment, which is shown in the accompanying drawing.

Figure 1:
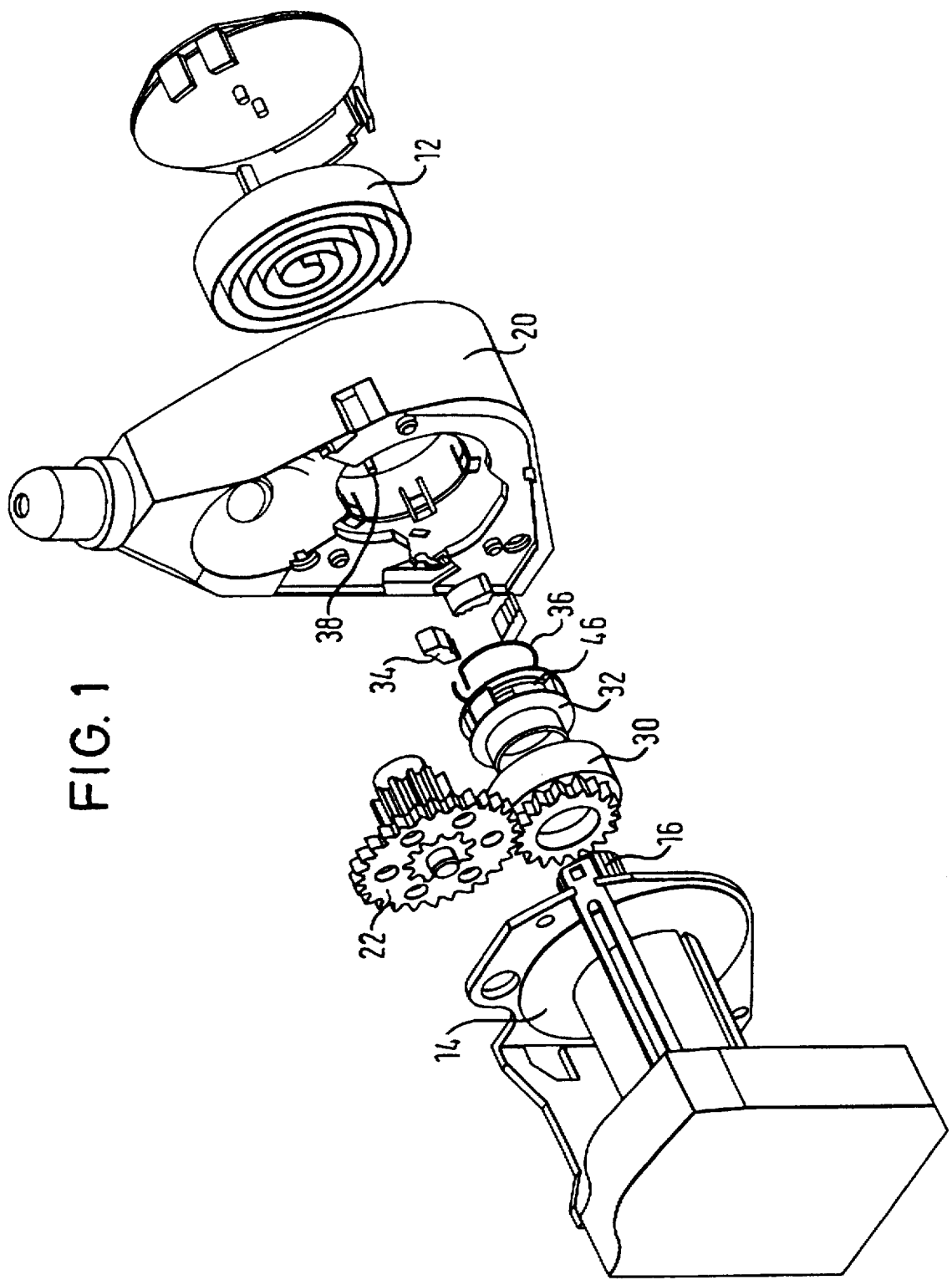
FIG. 1 shows a perspective exploded view of a belt retractor in accordance with the invention.
Figure 2:
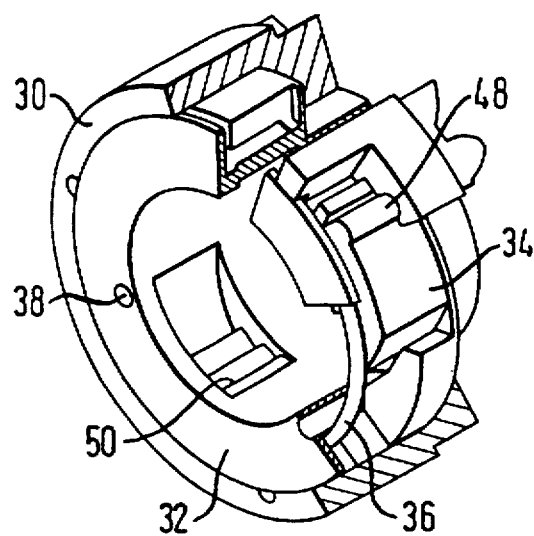
FIG. 2 is a perspective and partially sectioned view of a coupling as employed in the belt retractor of FIG. 1.

In FIG. 1 the reader will see a perspective view of a belt retractor in accordance with the invention and in FIG. 2 a perspective view of a coupling comprised in it. The belt retractor illustrated in FIG. 1 includes a belt drum 14, which on its side which is to the left in terms of this figure is provided with a generally known locking device, concealed by a cover, for the selective locking of the belt drum and on its side which is to the right in terms of the figure is provided with a belt pretensioner drive 20. The manner in which the locking device can lock the belt drum 14 and the belt pretensioner drive 20 can provide a tensioning action for the belt drum 14 is unimportant for understanding the invention; the important point is that the tensioning action of the belt pretensioner drive 20 is transmitted to the coupling of the belt retractor. This is performed in the present case via a transmission gear wheel 22, which acts on a hub 30 constituting the drive side of the coupling. Such hub 30 is arranged to be concentric to a drive pinion 16 constituting the output side of the coupling and fixedly connected to the belt drum 14, an annular space being formed between the drive pinion 16 and the hub 30. In such annular space three coupling pawls 34 are arranged with an equal angular distance apart about the drive pinion 16 and at a first end thereof same possess a rounded projection 48, which is so supported in a corresponding recess on the inner side of the hub 30 that a second end 50 thereof may be pivoted between a rest position clear of the gear teeth of the drive pinion 16 and a working position engaging the gear teeth. The support for the coupling pawls 34 on the hub is such (see also FIGS. 3 and 4) that in the working position of the coupling pawls 34, in addition to their projection 48, are also supported by means of a support surface 49 near to the latter, on a radial support shoulder 31 on the inner side of the hub 30 so that a particularly efficient transmission of force may take place in a tangential direction from the hub to the drive pinion 16.

Each coupling pawl 34 is provided with a guide in ramp 40 and a guide out ramp 42. On the second end 50 each coupling pawl 34 is provided with a plurality of coupling teeth complementary to the gear teeth of the drive pinion 16. It is preferred for the gear teeth of the drive pinion 16 not to be undercut. This means that the point angle of the teeth is larger than or equal to the value corresponding to an alignment of the surfaces responsible for transmission of torque in the coupling, at which the tangents to these surfaces extend through the axis of rotation of the drive pinion 16. The coupling furthermore comprises a cage 32, also concentric to the drive pinion 16 and having three projections extending in the annular space and between the coupling pawls 34. These projections are provided with cam surfaces, designed with a guide in surface 44 and a guide out surface 46, which cooperate with the guide ramp 40 and, respectively, with the guide out ramp 42. The cage may be turned in relation to the coupling pawls 34 between a first position or starting position, in which the coupling pawls 34 are held in the rest position by cooperation of the guide out ramps 42 and the guide out surfaces 46 (see FIG. 3) and a second setting, in which the coupling pawls 34 are held in the working position by cooperation of the guide in ramps 40 and the guide surfaces 44 (see FIG. 4). The cage 32 is held by shear pins 38 to prevent turning relative to the housing of the belt retractor prior to operation of the belt pretensioner drive 20. In the annular space furthermore a return spring 36 is arranged, whose one end bears against the cage 32 and whose other end bears on the hub 30. The belt retractor is lastly provided with a wind up spring 12 for the belt drum 14, which urges the belt drum 14 in the wind up direction of the belt webbing.

Figure 3:
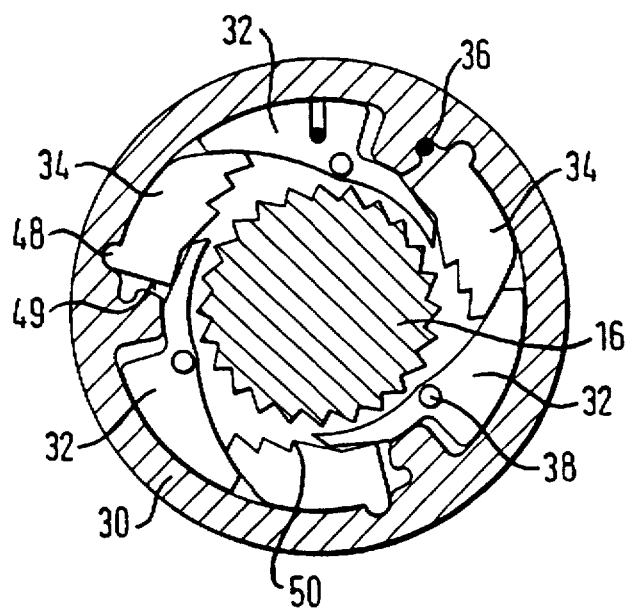
FIG. 3 is a diagrammatic cross section taken through the coupling of FIG. 2, same being in the rest position.
Figure 4:
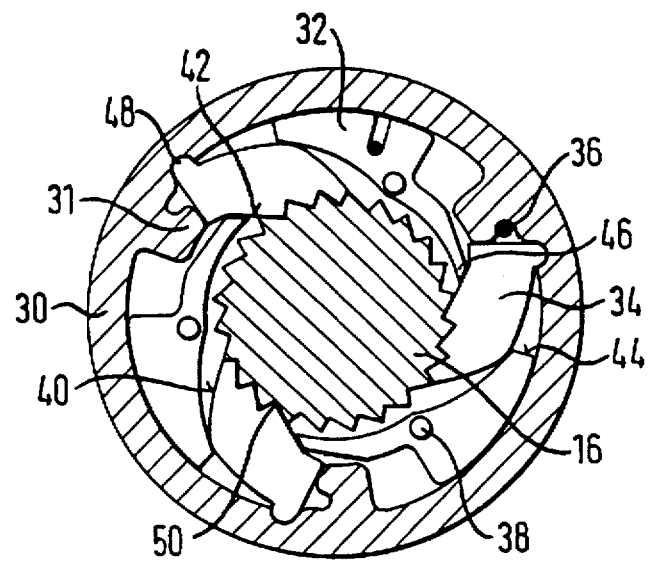
FIG. 4 is a diagrammatic cross section taken through the coupling of FIG. 2, same being in the working position.

The manner of operation of the belt retractor will now be described with reference to FIGS. 3 and 4. In FIG. 3 the cage 32 is illustrated in its first position. It will be perceived that the coupling pawls 34 are held, by engagement of their guide out ramps 42 on the guide out surfaces 46 of the cage, in the rest position thereof, in which position the second ends 50 of the coupling pawls 34 are clear of the gear teeth of the drive pinion 16. This is the position adopted by the coupling prior to performance of the tensioning operation. When the tensioning operation is commenced the hub 30 is turned in relation to the drive pinion 16 clockwise in terms of FIGS. 3 and 4. Since the cage 32 is locked in relation to the belt retractor as regards rotation by means of the shear pins 38, there is a movement of the coupling pawls 34, which bear against the hub 30, in relation to the cage 32. In this respect the coupling pawls 34 are pivoted into the working position owing to their guide in ramps 40 running against the guide in surfaces 44 of the cage, while at the same time the guide out ramps 42 are released by the guide out surfaces 46 so that there will be an engagement of the coupling teeth of the second end 50 of the coupling pawls 34 with the gear teeth of the drive pinion 16. Owing to the arrangement of the coupling pawls 34 and of the selected gear teeth of the drive pinion 16 as from a first contact between the first ends 50 of the coupling pawls 34 and the drive pinion 16 a torque will take effect on the coupling pawls 34, which aids in completely guiding the coupling pawls 34 into the gear teeth of the drive pinion 16. This completely engaged position of the coupling pawls 34 is depicted in FIG. 4. There is then an abutment of the support surfaces 49 on the hub 30. As soon as the completely engaged position is reached, no further relative movement may take place between the coupling pawls 34 and the cage 32. The shear pins 38 connecting the cage 32 with the belt retractor are however so designed that after reaching the condition of the coupling illustrated in FIG. 4, that is to say the second position of the cage 32, they will be shorn off on further rotation of the hub 30. Accordingly the cage 32 is now able to be freely turned together with the hub 30 and the coupling pawls 34, and torque applied during tensioning by the belt pretensioner drive 20 to the belt drum 14 will be transmitted on the one hand by the positive link between the hub 30 and the coupling pawls 34 and on the other hand the coupling pawls 34 and the drive pinion 16. Since the positive control of the coupling pawls 34 is produced by a rotary movement, that is to say a rotary movement of the cage 32 in relation to the coupling pawls 34, and owing to the support surfaces 49 and the support shoulders 31 a particularly advantageous transmission of force is produced to the coupling pawls 34, the coupling is particularly compact. Owing to the cooperation of the cam surfaces of the cage 32 with the coupling pawls 34 it is furthermore possible to ensure that the rounded projection 48 of each coupling pawl 34 remains in the recess, provided for it, on the inner side of the hub 30.

When after the termination of the tensioning operation the load in the safety belt system is reduced again, the torque acting in the coupling will also be reduced. As soon as this torque decreases below a certain value, the return spring 36, acting between the hub 30 and the cage 32, and which urges the cage 32 into its first position, will move the cage 32 in a clockwise direction in relation to the hub 30 in terms of FIG. 4 and in relation to the coupling pawls 34 out of the second position back into the first position. Accordingly the coupling pawls 34 will be pivoted by cooperation of their guide out ramps 42 with the guide out surfaces 46 of the cage 32 back into the rest position, the guide in surfaces 40 releasing the guide in ramps 44 so that the second end 50 of the coupling pawls comes clear of the gear teeth of the drive pinion 16. Thus the driving connection between the belt pretensioner drive 20 and the belt drum 14 is now discontinued; the belt drum 14 is again able to be freely rotated. The disconnection of the coupling is performed in a reliable fashion, since owing to the non-undercut gear teeth of the drive pinion 16 the coupling teeth of the coupling pawls 34 cannot jam in the teeth. The transfer of the cage 32 from its second position into its first position is aided by the action of the wind up spring 12, since the same tends to produce a wind up movement of the belt drum, which facilitates movement of the coupling teeth of the coupling pawls 34 clear of the gear teeth. This supporting action of the wind up spring 12 is however subject to severe restrictions, since excessive dimensions or strength of the wind up spring would reduce the comfort of the vehicle occupants wearing the safety belts. A stronger return spring 36 would however not affect wearer comfort of the safety belt so that such return spring can be made so strong that reliable release of the coupling is ensured after tensioning. The upper limit for the strength or size of the return spring 36 is however subject to the requirement that during a tensioning operation transfer of the cage 32 from its second into its first position must be reliably prevented.

I claim:

1. A belt retractor for a vehicle safety belt system comprising a locking device for a belt drum (14) and a rotary belt pretensioner drive (20), said drive being able to be connected drivingly with a drive pinion for the belt drum (14) via a coupling having pawls (34) able to be shifted between a rest position out of engagement with the drive pinion (16) and a working position in engagement with the drive pinion (16), wherein said coupling pawls (34) are able to be moved positively both out of the rest position into the working position and furthermore from the working position into the rest position by running against cam surfaces rotating in relation to them and said coupling pawls (34) are provided with a guide in ramp (40) and with a guide out ramp (42) and said cam surfaces are formed as guide in surfaces (44) and guide out surfaces (46), which cooperate with said guide in ramps (40) and, respectively, said guide out ramps (42).

2. The belt retractor as claimed in claim 1, characterized in that on a drive side thereof the coupling possesses a hub (30), on which the coupling pawls (34) are deflectably supported and a cage (32) releasably fixed on the housing of the belt retractor and on which the cam surfaces are formed.

3. The belt retractor as claimed in claim 2, characterized in that the hub (30) is arranged concentrically to the drive pinion (16), that between the hub (30) and the drive pinion (16) an annular space is formed, in which the coupling pawls (34) are arranged, a first end (48) thereof so bearing on the hub that a second end (50) thereof is able to be pivoted into engagement with the gear teeth of the drive pinion (16), and in that the cam surfaces of the cage (30), which is as well concentric to the drive pinion (16), are formed on projections extending into the annular space between the coupling pawls (34) as said guide in surfaces (44) and said guide out surfaces (46), which cooperate with the guide in ramps (40) and, respectively, the guide out ramps (42).

4. The belt retractor as claimed in claim 3, characterized in that the cage (32) is connected with the housing of the belt retractor by means of shear pins (38) which on rotation of the hub (30) are shorn off after inward pivoting of the coupling pawls (34) and in that between the cage (32) and the hub (30) a return spring (36) acts, which returns the cage (32) into its initial position in relation to the hub (30) after termination of the tensioning operation.

5. The belt retractor as claimed in claim 1, characterized in that three coupling pawls (34) are arranged with equal angular spacing around the drive pinion (16).

6. The belt retractor as claimed in claim 1, characterized in that the ends of the coupling pawls (34) are provided with a plurality of coupling teeth and are able to be guided into engagement with the gear teeth of the drive pinion (16).

7. The belt retractor as claimed in claim 1, characterized in that the gear teeth of the drive pinion (16) are not undercut.

8. The belt retractor as claimed in claim 1, characterized in that the first end of each coupling pawl (34) is designed with a rounded projection (48), which is pivotally mounted in a corresponding recess at the inner side of the hub (30).

9. The belt retractor as claimed in claim 1, characterized in that the hub (30) possesses a radial support shoulder (31) for each coupling pawl.

* * * * *